(12) United States Patent
Knoener

(10) Patent No.: US 6,858,818 B2
(45) Date of Patent: Feb. 22, 2005

(54) AUTOMATIC WIRE FEED CONTROL FOR A WELDING SYSTEM

(75) Inventor: Craig S. Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 66 days.

(21) Appl. No.: 10/249,003

(22) Filed: Mar. 7, 2003

(65) Prior Publication Data

US 2004/0173591 A1 Sep. 9, 2004

(51) Int. Cl.[7] .............................................. B23K 9/10
(52) U.S. Cl. ........................ 219/137.71; 219/130.5
(58) Field of Search ...................... 219/130.5, 130.51, 219/137 PS, 130.21, 130.31, 130.32, 130.33, 137.71

(56) References Cited

U.S. PATENT DOCUMENTS 3,968,340 A * 7/1976 Fernicola ............... 219/130.31
4,301,355 A * 11/1981 Kimbrough et al. ... 219/137 PS
4,584,457 A * 4/1986 Dilthey et al. ......... 219/137.71
5,168,144 A * 12/1992 Hongu et al. .......... 219/137.71
5,278,390 A * 1/1994 Blankenship ............ 219/130.5

OTHER PUBLICATIONS

Miller Electric Manufacturing Co.; S–74DX Control Owner's Manual, Jan. 2003.

* cited by examiner

Primary Examiner—Clifford C. Shaw
(74) Attorney, Agent, or Firm—Ziolkowski Patent Solutions Group, LLC

(57) ABSTRACT

A system and method of controlling a wire feeder of a welding-type system is disclosed. A wire feeder including a controller capable of accepting a user input that includes desired mode, desired current output and desired voltage output. The controller then causes the welding-type system to operate according to the user input. The controller is also capable of acquiring output conditions of the welding-type system and determining a difference between the user input and the output conditions. The controller is further enabled to automatically adjust a speed of the wire feeder according to the user input mode and the desired current output or the desired voltage output.

38 Claims, 5 Drawing Sheets

AUTOMATIC WIRE FEED CONTROL FOR A WELDING SYSTEM

BACKGROUND OF INVENTION

The present invention relates generally to a control for a wire feeder of a welding-type system. Specifically, the invention accepts a user selected mode, a current, and a voltage and then maintains the user selected current and voltage according to the user selected mode. The invention includes a control to allow the user to adjust a wire feed speed manually or allow the control to adjust the wire feed speed according the user-selected voltage and/or current inputs.

Wire feeders are typically used to feed metal wire into a weld during a welding process such as Gas Metal Arc Welding (GMAW) and other welding processes. Typical wire feeders have a drive roller assembly for driving the metal feed from a feed spindle through a welding gun for introduction to the weld. Power is supplied to the drive roller assembly by a welding power supply via a weld cable. The amperage or current generated by the power supply governs the speed in which the metal feed is fed to the weld, or the wire feed speed (WFS). Generally, the higher the amperage supplied to the wire feeder, the greater the WFS. Conversely, if voltage is used to govern the WFS, the lower the voltage, the higher the WFS. Accordingly, the speed by which the wire feeder supplies the metal filler to the weld is a direct function of the power delivered to the wire feeder and therefore, the weld. Furthermore, by adjusting the WFS and holding either voltage or current constant, the adjustment to the WFS causes the non-constant value to be adjusted accordingly.

The thickness of the metal being welded determines the power required at the weld and thus the WFS necessary to deliver that power. A thicker metal requires higher power to effectively weld. The wire feeder includes a wire feed control to control the power delivered to both the wire feeder and the point of the weld. Typically, the wire feed control allows the welding system to operate in at least one of two modes; either constant voltage (CV) or constant current (CC).

Should the user choose CV mode, as is most common in the United States, a user selected voltage is required. The voltage is an indication of the voltage desired at the point of the weld and is held constant by the power supply. It is also necessary to select an initial WFS. The WFS indicates the speed with which the metal filler is delivered to the point of the weld but when the mode is CV, also corresponds to an output current. By holding the output voltage constant, the user can manipulate the output current by adjusting the WFS. Since the WFS is directly proportional to the current delivered to the wire feeder and point of the weld, the higher the WFS, the greater the current delivered to the weld. However, should the user choose CC, as is common internationally, the user input current is held constant and the user can adjust the WFS to obtain the desired voltage at the weld. In this case, the user must lower the WFS in order to raise the voltage at the weld or raise the WFS to lower the voltage at the weld.

To enable a user to select the appropriate WFS, wire feed controls include a voltmeter, an ammeter, a wire-speed meter or a combination thereof. Should a voltmeter and ammeter be included, the user selects the desired mode, for instance CV. The user then selects the desired voltage and initial WFS. By viewing the current delivered on the ammeter, the user can manually adjust the WFS until the ammeter displays the desired current.

However, some wire feed controls include only a voltmeter, if CV, or only an ammeter, if CC. In this case, a wire-speed meter is included. In the case of a CV welding system, the user selects the desired voltage and the appropriate WFS is discerned from a look-up table. The look-up table is a listing of output current values and corresponding WFS. By finding the desired current in the look-up table, the user can discern the associated WFS required to deliver the desired current to the weld.

However, by requiring the user to manually adjust the WFS, human error is possible. Furthermore, the current delivered to, and the voltage at, the weld varies according to the conditions at the weld. As such, it may be necessary to adjust the WFS during the welding process to maintain the desired output conditions. Therefore, whether through human error or a varying load, it is possible to have an incorrect WFS and thus, an incorrect amount of power delivered to the weld. If the weld is underpowered, the weld will probably be insufficient to adequately join the materials being welded. On the other hand, if the weld is overpowered, it is possible to "burn through" the materials being welded.

It would therefore be desirable to have a system and method capable of delivering the desired current and voltage by adjusting the WFS automatically. The system and method would alleviate the reliance upon human intervention when adjusting the WFS and lower the possibility of insufficient welds or "burn throughs" due to varying loads.

BRIEF DESCRIPTION OF INVENTION

The present invention provides a system and method of controlling a wire feeder of a welding-type system. Specifically, the invention is a wire feeder with a control having user selected modes that enable the control to automatically adjust the wire feed speed according to pre-set, user-defined, voltage and/or current inputs.

In accordance with one aspect of the invention, a control operable with a wire feeder of a welding-type system is disclosed. The control is configured to acquire user input of a mode selection and one of a current selection and a voltage selection. A signal is then sent to a power supply of the welding-type system to cause the power supply to operate according to the user selection. The control then acquires output conditions from the welding-type system and determines the difference between the user selection and the output conditions to create an error margin. According to the error margin, the control automatically adjusts the wire feed speed in order to adjust the output conditions according to the user input.

In accordance with another aspect of the invention, a welding-type system is disclosed. The welding-type system includes a power supply, welding apparatus and wire feeder. The wire feeder includes a display and control panel configured to receive and display user selections. Furthermore, a processor is included, which when a set of instructions is executed, is caused to receive a user input for the display and control panel and output operating constraints based on the user selection to the power supply. The processor is also caused to determine present operating conditions of the welding apparatus and output a speed adjustment signal to control the speed of the wire delivered by the wire feeder.

In accordance with another aspect of the present invention, a computer readable storage medium having a computer program stored thereon and representing a set of instructions is provided. The instructions, when executed by a computer, cause the computer to detect a plurality of user defined parameters and activate a power supply to operate according to the user defined parameters. The instructions further cause the computer to detect a plurality of actual operating parameters and determine if there is a difference between the user defined parameters and the actual operating parameters. The instructions then cause the computer to adjust a wire feed speed according to the determination.

In accordance with yet another aspect of the present invention, a method of controlling a wire feed control is provided. The method includes accepting user input and activating a power supply to operating according to the user input. The method then includes determining the operating condition of a welding gun and further determining a difference between the operating condition of the welding gun and the user input. The method then includes adjusting a wire feed speed automatically wherein the adjustment corresponds to the difference between the operating condition of the welding gun and the user input.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
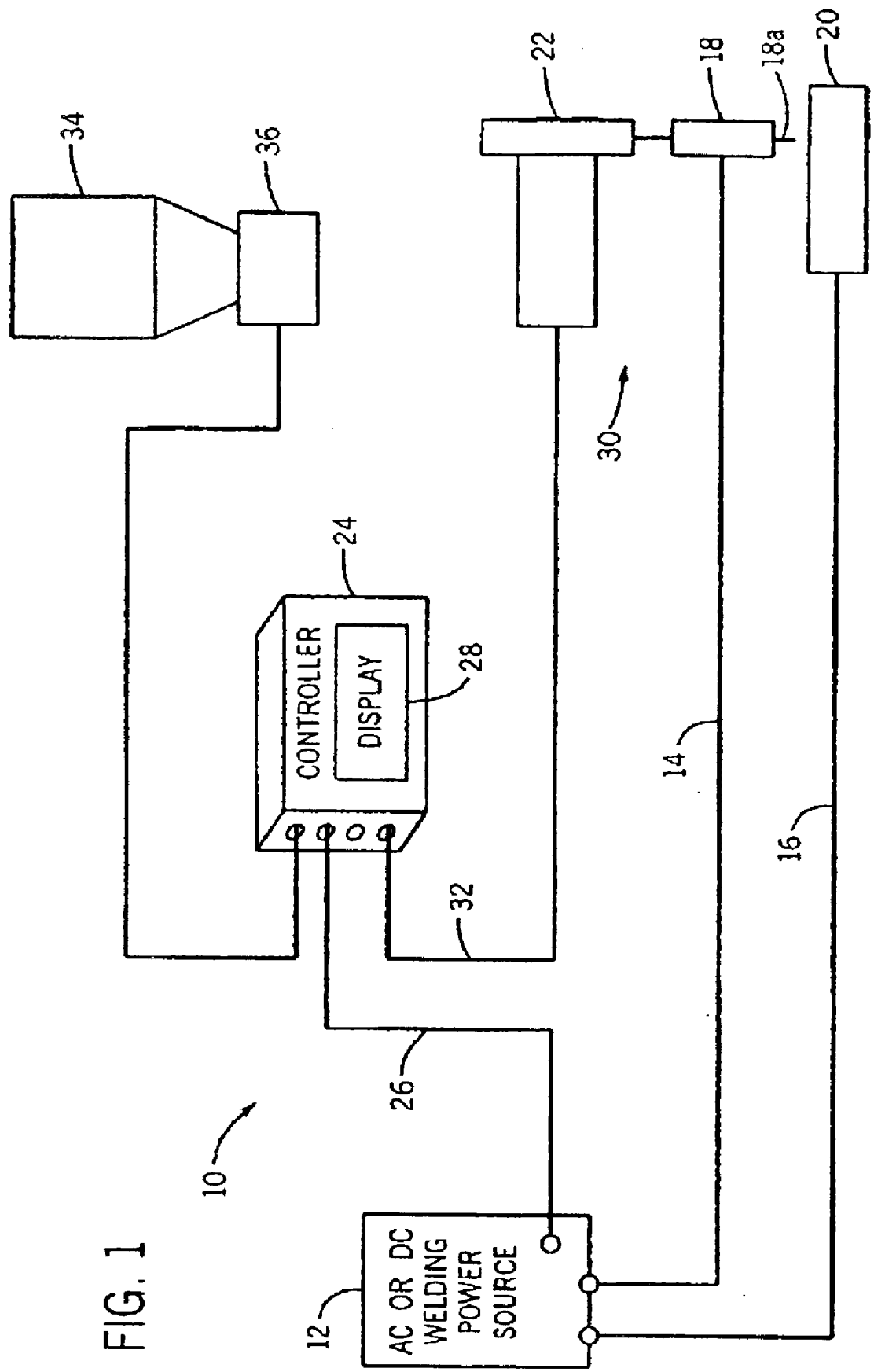
FIG. 1 is a perspective view of a wire feed control attached to a welding power supply and a welding apparatus.

Referring to FIG. 1, a welding-type system 10 is show incorporating the present invention. This exemplary welding system is preferably a submerged arc welding system which is typically used in applications requiring maximum penetration and/or x-ray quality welds. System 10 includes at least one power supply 12, which can be an AC or a DC welding power supply. The power supply 12 has a pair of weld cables 14, 16 connected to a welding torch 18 and a workpiece 20. The welding torch 18 has a wire drive assembly 22, that includes a spool of welding wire (not shown) that is supplied to the weld under control of a controller 24 that is connected to the power supply 12 through a control cord 26. The wire drive assembly 22 includes therein a wire feeder and a wire spool arrangement to supply wire to the welding torch 18 via commands from control line 32 connected to the controller 24. The controller 24 has a microprocessor capable of being programmed to operate according to certain algorithms and/or programs. User selections or inputs received by the controller 24 from a display and control panel 28 and an internally programmed algorithm cause welding system 10 to operate according to the user selections.

Power and wire are delivered to a welding apparatus 30, that include the welding torch 18 and the wire drive assembly 22, according to the user selection. When the welding torch 18 of the welding apparatus 30 is positioned proximate to workpiece 20, welding wire is fed into contact with the workpiece 20. Once triggered, an electrical current and voltage are generated to cause the welding wire to be heated and melt. As a result, an electrical arc is established which causes the welding wire to continue to melt as well as transfer the melted welding wire to the workpiece 20 where the welding wire fuses and cools with the workpiece 20. Because the electrical energy supplied to the welding system is typically greater than that required to melt the welding wire, most of the remaining energy is in the form of heat which is transferred to the surface of the workpiece 20 resulting in the workpiece 20 also melting and improving bonding between the melted welding wire and the workpiece 20. As the welding torch 18 is translated across the workpiece 20, melted welding wire is continuously transferred to the workpiece 20. A flux hopper 34 may be included to deliver granular flux to the weld, as required in submerged arc welding. A valve 36 is connected to controller 24 to control delivery of the granular flux to the weld to keep the welding nozzle 18a submerged.

Figure 2:
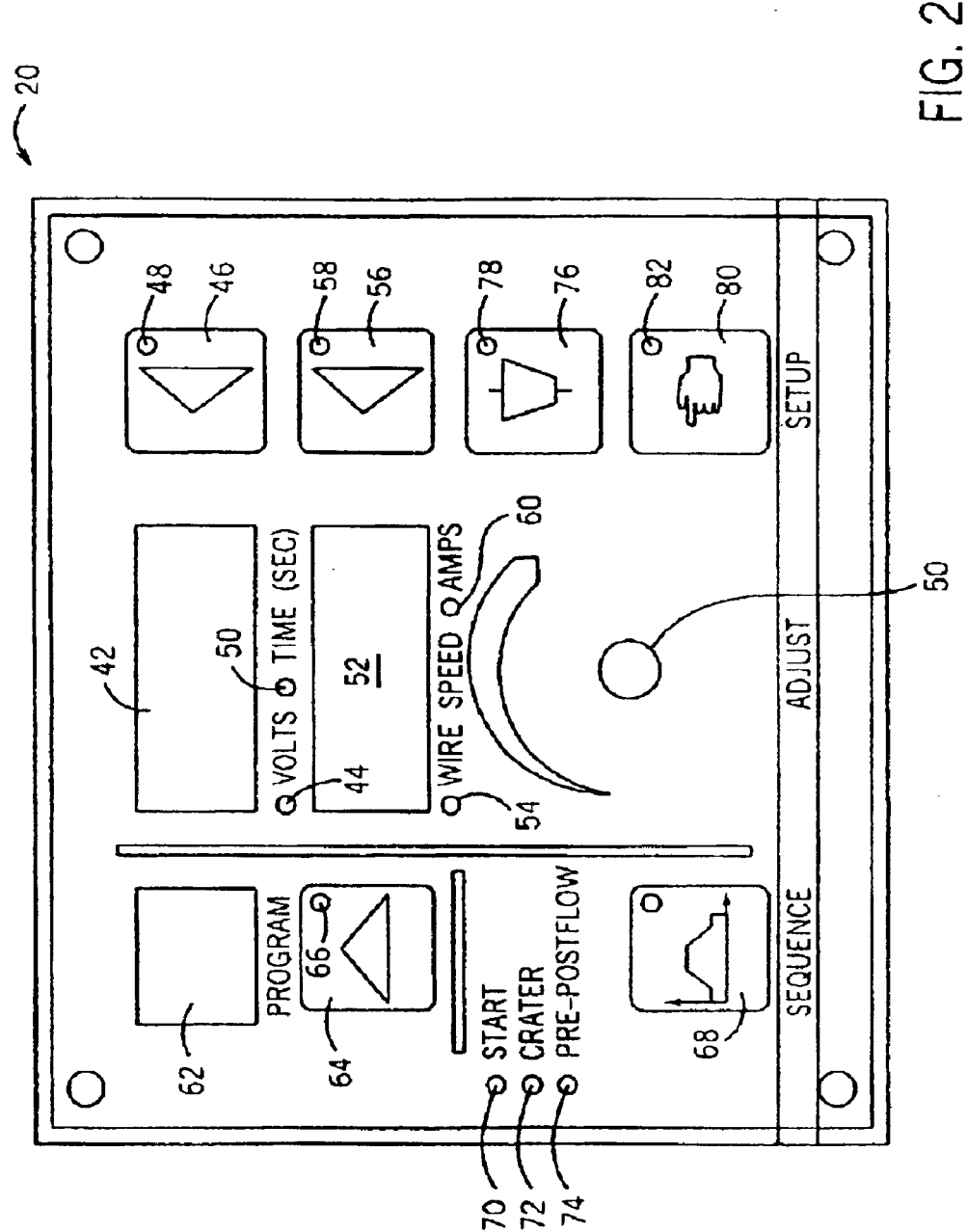
FIG. 2 is a front elevational view of a display and control panel of the wire feed control shown in FIG. 1.

FIG. 2 shows a detailed view of the display and control panel 28 of the controller 24 of FIG. 1. As stated, the display and control panel 28 provides a user interface for the welding-type system 10 and the power supply 12. Referring now to FIG. 2, an upper display 42 is included to display voltage or time information. Voltage information can be displayed for both actual, or output, voltage as well as preset or user input voltages. When displaying voltage information a voltage labeled light emitting diode 44 (LED) is illuminated. The upper display button 46 can be depressed to display, input, or adjust weld time. An upper display button LED 48 accompanies the upper display button 46 to indicate when information displayed in the upper display 42 may be adjusted by an adjustment control 50. By rotating the adjustment control 50 it is possible to increment or decrement the selected item. To change the displayed information, upper display button 46 can be depressed and voltage LED 44 is turned off while a time LED 51 is illuminated. Corresponding to the time LED 51 illumination, upper display 42 displays time information relating to the duration of a welding sequence.

A second, lower display 52 is also included. The lower display 52 displays wire feed speed (WFS) or amperage (current) information. When displaying WFS, a WFS LED 54 is illuminated. Accompanying the lower display 52 is a lower display button 56 that may be depressed to display, input or allow adjustment of either the WFS or current. The lower display button 56 can be used to cause the lower display 52 to display current in amps. If current is displayed an amps LED 60 is illuminated. A lower display button LED 58 is illuminated to indicate when it is possible to adjust the information displayed in the lower display 52. When the lower display button LED 58 is illuminated, the adjustment control 50 can be used to adjust the value of the displayed item, i.e. WFS or current.

A program display 62 is also included. The program display 62 is dedicated to displaying information relating to the active or queued programs. A program button 64 allows a user to activate a program select feature. By pressing the program button 64 and rotating the adjustment control 50 the user can cycle through and select various welding programs. A display button LED 66 is illuminated to indicate when the adjustment control 50 is enabled to adjust a program displayed in the program display 62.

A sequence button 68 is included to allow a user selection of welding sequences. Accompanying the sequence button 68 are LEDs that correspond to sections of the welding sequence. In accordance with a preferred embodiment, three LEDs are included to indicate whether the welding sequence is in one of three sections of the welding sequence: start 70, crater 72, or pre-postflow 74.

Additionally, a flux valve button 76 may be included to control the opening and closing of the flux valve 36 of FIG. 1, which controls the flux hopper 34. To indicate the state of the flux valve, flux valve button 76, FIG. 2, has a flux valve button LED 78. Flux valve button LED 78 is illuminated to indicate the flux valve is in an open state, thus delivering flux to the weld.

A setup button 80 is also provided to allow the user to select the mode of operation. The setup button 80 allows the user to cycle through a plurality of menus. In one embodiment, the menus include a mode menu, a run-in menu, a burn-back menu, an auto-flux menu and a units menu. The mode menu allows a user to make a mode selection. As will be described more fully hereinafter, the mode selection may include modes of constant current, constant voltage, constant current plus voltage, constant voltage plus current. Set up button 80 is equipped with a setup button LED 82 to indicate the activation of the setup button, which enables setup selections from the menus.

As stated with respect to FIG. 1, the controller 24 includes a wire feeder control for operation of the wire feeder as well as communication with the welding-type system 10. Furthermore, the controller 24 includes a processor to execute instructions to cause the processor to operate according to the following processes. Accordingly, the controller is capable of causing the welding-type system 10 to operate according to constraints communicated by the processor.

As stated with respect to FIG. 2, setup button 80 may be used to enter a selection mode. Once the setup button 80 has been used to access the mode menu, the adjustment control 50 may be used to choose a desired mode. In one embodiment, four modes are included: constant current, constant voltage, constant current plus voltage, and constant voltage plus current.

Figure 3:
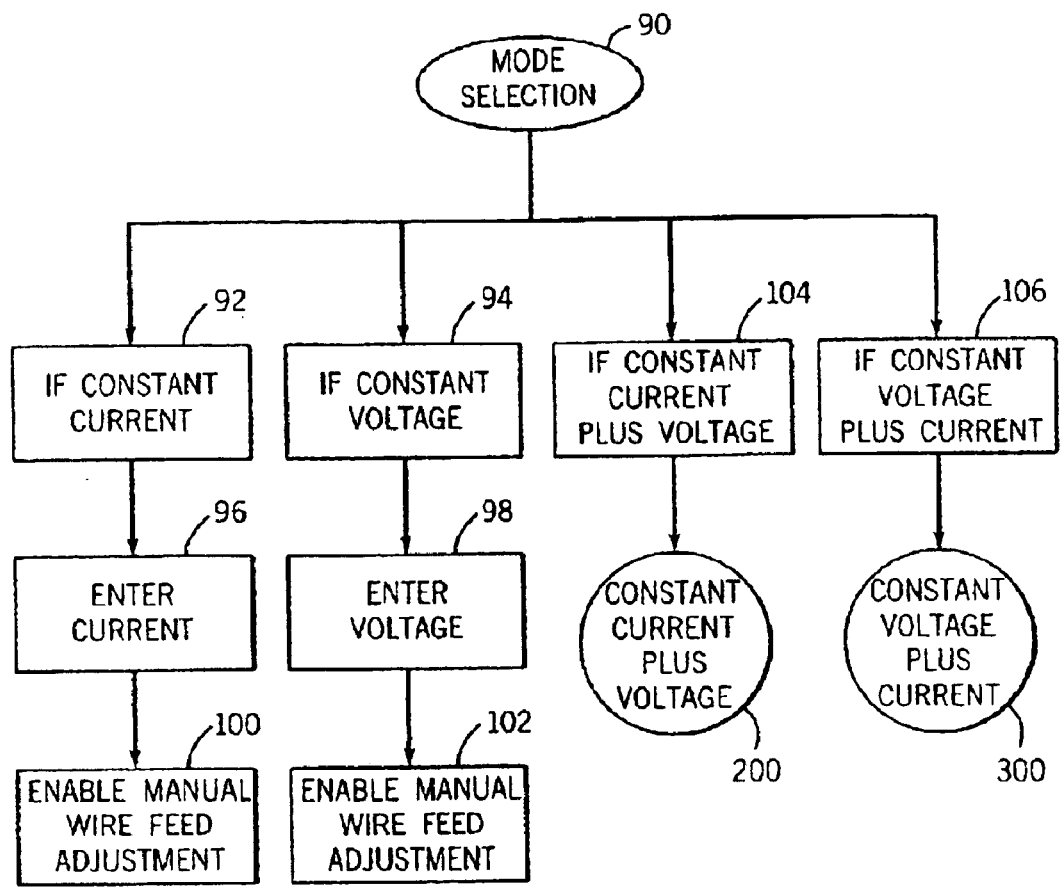
FIG. 3 is a high level flow chart for selecting a mode of operation in accordance with the present invention.

Referring now to FIG. 3, a high level flow chart for selecting a mode of operation in accordance with a preferred embodiment is set forth. Should the mode selection 90 be constant current 92 or constant voltage 94, an algorithm prompts the user to select a target current 96 or a target voltage 98, respectively. The target current or target voltage corresponds to the desired output conditions during the welding process. Next, in either constant current 92 or constant voltage 94, manual WFS adjustment 100, 102 is enabled to allow the user to adjust the WFS. Accordingly, if in constant current mode 92, the voltage is set according to the manually adjusted WFS 100. Alternatively, if in constant voltage mode 94, the current is set according to the manually adjusted WFS 102. Therefore, when in constant current 92 or constant voltage 94, the user maintains control of the WFS during operation of the welding-type system 10 in order to manually control WFS 100, 102 and maintain the desired power output. The algorithm continues to operate accordingly until the welding is finished.

Figure 4:
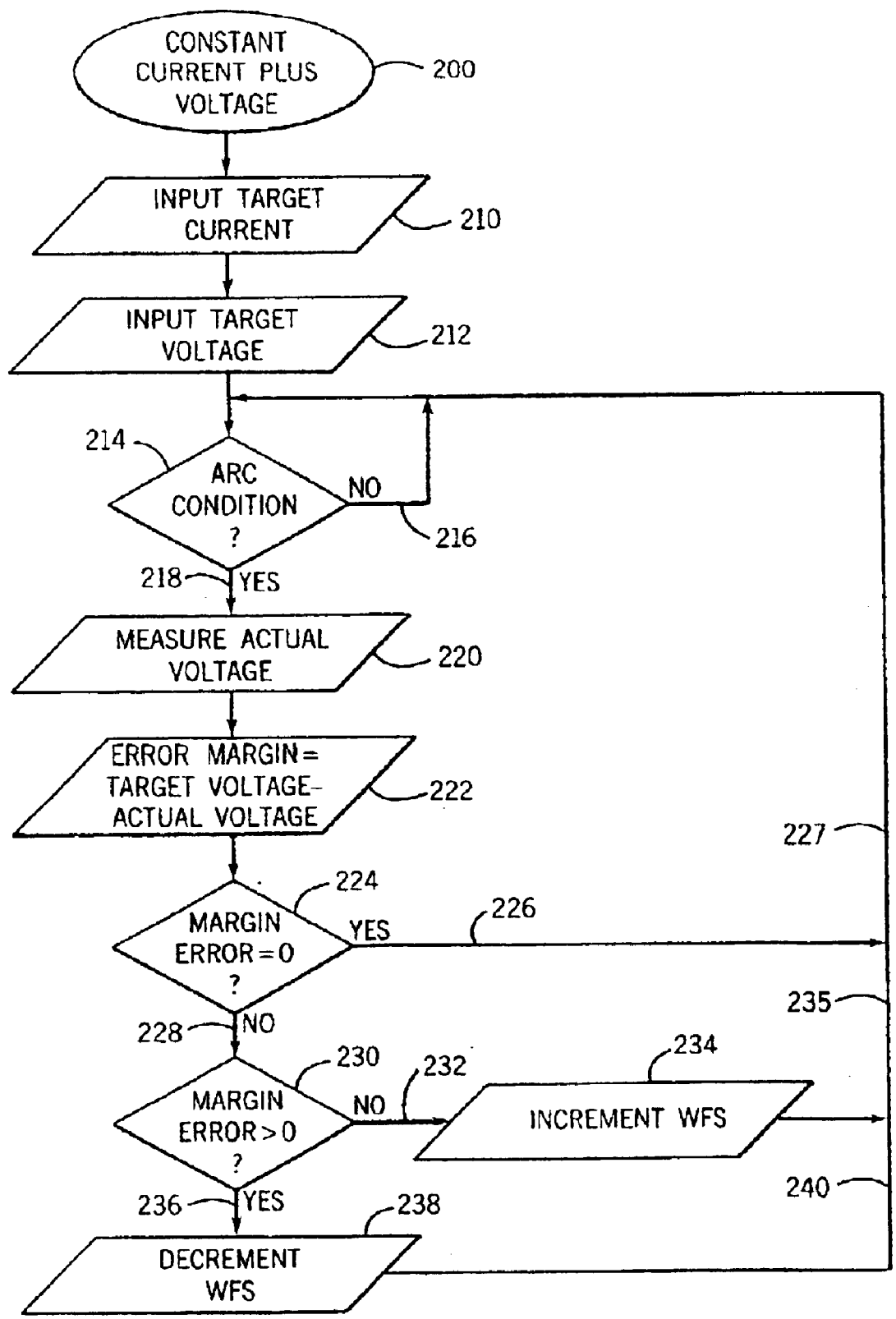
FIG. 4 is a detailed flow chart for automatically adjusting the wire feed speed for one mode as selected in FIG. 3.

Alternatively, the mode selection 90 may be set to constant current plus voltage 104 or constant voltage plus current 106 and if so selected, a respective constant current plus voltage algorithm 200 or a constant voltage plus current algorithm 300 is called. Continuing to FIG. 4, if the mode selection is constant current plus voltage 104, a constant current plus voltage algorithm is initiated 200 and the user is prompted to input a target current 210 and input a target voltage 212. Upon entering the target current 210 and the target voltage 212, the algorithm communicates the user selections to the power supply 12, FIG. 1. The algorithm then begins acquiring the output conditions of the welding-type system 10. The output conditions may include an arc condition, actual or output voltage, and actual or output current. An arc condition 214, FIG. 4 indicating whether an arc is present is initially checked. If no arc is indicated as present 216 the algorithm continues checking the arc condition 214 until an arc is indicated to be present 218. Therefore, the algorithm does not continue until an arc is determined to be present 218. Once an arc is indicated 218, the actual voltage, or output voltage, is measured 220. Using the actual voltage measurement 220, an error margin is determined 222 by subtracting the target voltage from the actual voltage.

Once the error margin is calculated 222, the value of the error margin is checked 224 to see if it is equal to zero. If the error margin is equal to zero 226, i.e. the target voltage is equal to the actual voltage, then the target voltage is at the user input value and no change to the output conditions (WFS) is necessary. The process is then reiterated 227 beginning with checking the arc condition 214 until the welding are complete.

If the error margin is not equal to zero 228, the error margin is then checked to see if it is greater than zero 230. If the error margin is not greater than zero 232, i.e. the actual voltage is greater than the target voltage, then the actual voltage must be lowered to correspond to the target voltage. Because voltage and WFS have an inverse relationship, the algorithm automatically increments the WFS 234 to lower the actual voltage. The process is then reiterated 235 beginning with checking the arc condition 214 until the welding is complete.

However, if the error margin is greater than zero 236, then the target voltage is greater than the actual voltage. Accordingly, the WFS is automatically decremented 238, thus raising the actual voltage. The process is then reiterated 240 by checking the arc condition 214.

Figure 5:
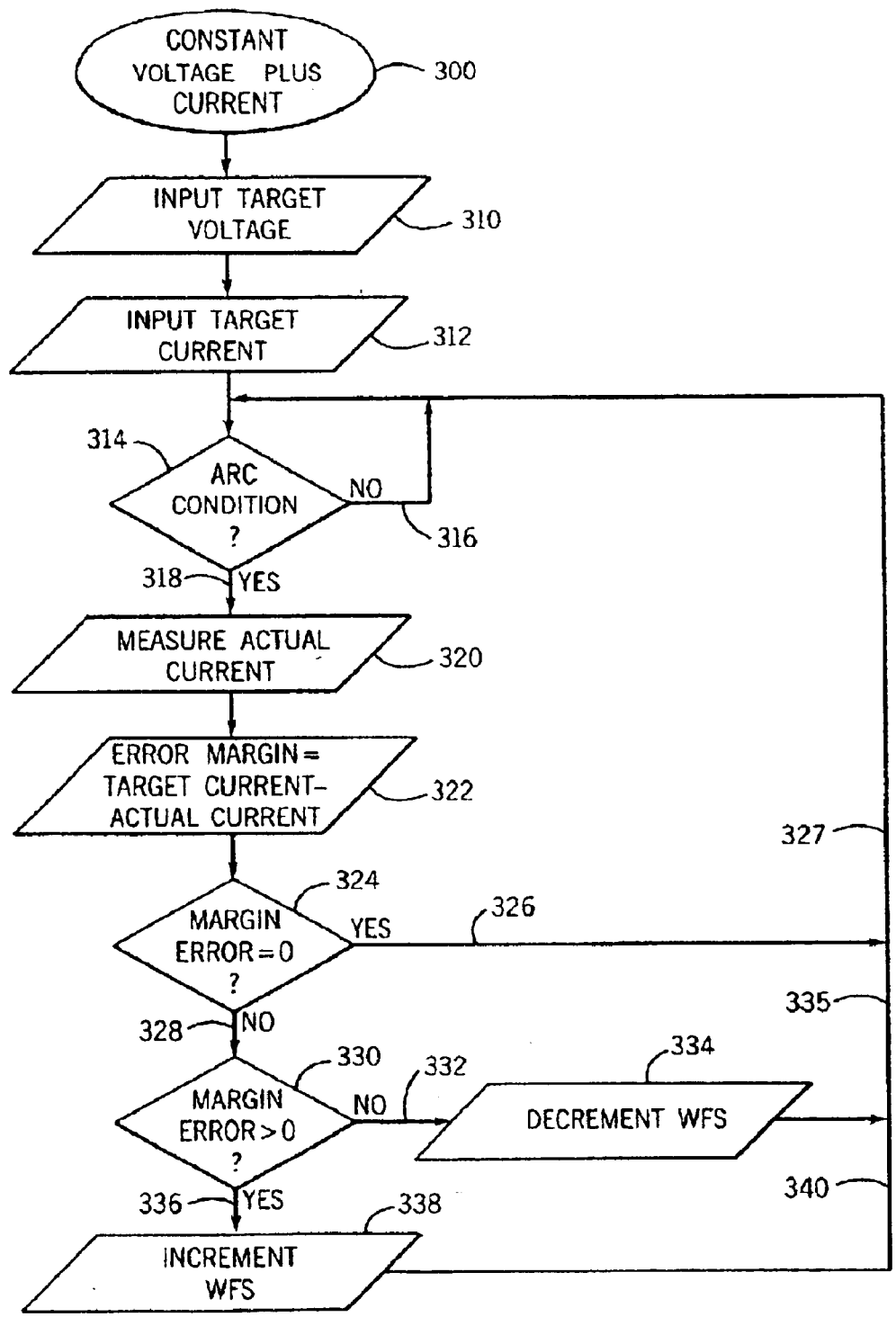
FIG. 5 is a detailed flow chart for automatically adjusting the wire feed speed for another mode as selected in FIG. 3.

Referring to FIG. 5, if the mode selection is constant voltage plus current 106, FIG. 3, then the constant voltage plus current algorithm is initiated 300 and the user is prompted to input a target voltage 310, FIG. 5, and input a target current 312. Upon entering the target current 312, the algorithm begins control of the welder-type system 10. After communicating the user selections of target voltage 310 and target current 212 to an accompanying power supply 12, FIG. 1, the algorithm continues by acquiring the output conditions at the welding-type system 10, FIG. 1. An arc condition 314, FIG. 5, indicating whether an arc is present, is initially checked. If no arc is indicated as present 316, the algorithm continues checking the arc condition 314 until an arc is indicated to be present 318. Once an arc is indicated 318, the actual current, or output current delivered is measured 320. Using the actual current measurement 320, an error margin is determined 322 by subtracting the target current from the actual current.

Once the error margin is calculated, the value of the error margin is checked to see if it is equal to zero 324. If the error margin is equal to zero 326, i.e. the target current is equal to the actual current, then the target current is at the user input value and no change to the output conditions (WFS) are necessary. The process is then reiterated 327 beginning with checking the arc condition 314 until the welding is complete.

If the error margin is not equal to zero 328, the error margin is then checked to see if it is greater than zero 330.

If the error margin is not greater than zero 332, i.e. the actual current is greater than the target current, then the actual current must be lowered to correspond to the target current. As commonly known, current and WFS have a direct relationship. As such, the algorithm decrements the WFS 334 to lower the actual current. The process is then reiterated 335 beginning with checking the arc condition 314 until the welding is complete.

However, if the error margin is greater than zero 336, then the target current is greater than the actual current. Accordingly, the WFS is automatically incremented 338, thus raising the actual current. The process is then reiterated 340 beginning with checking the arc condition 314 until the welding is complete.

It is contemplated that the above method can be embodied in a computer program, stored on a computer readable storage medium. The program, when executed by one or more processors of a computer system or server, cause the server to implement the above process.

It is further contemplated that the above described invention can be embodied in a control operable with a wire feeder of a welding-type system. The control is designed to acquire a user selection that includes a mode selection and at least one of a current selection and a voltage selection. The control is also designed to send a signal to a power supply to cause the power supply to operate according to the user selection. The control is further designed to acquire output conditions of the welding-type system and determine a difference between the user selection and at least one of the output conditions of the welding-type system to create an error margin. The control then adjusts a wire feed speed automatically in response to the error margin in order to minimize the error margin.

It is also contemplated that the above invention be embodied in a welding-type system which includes a power supply, a welding apparatus, and a wire feeder. The wire feeder is designed to include a display and control panel to receive and display user selection. The wire feeder also includes a processor to execute a set of instructions. The processor, upon execution of the instructions is caused to receive a user selection from the display and control panel and output operating constraints, based on the user selection, to the power supply. The processor is then caused to determine present operating conditions of the welding apparatus and output a speed adjustment signal to control the speed of wire delivered by the wire feeder.

It is further contemplated that the above described algorithm be embodied on a computer readable storage medium as a computer program representing a set of instruction. The instructions, when executed by a computer, cause the computer to detect a plurality of user defined parameters and activate a power supply to operate according to the user defined parameters. The instructions further cause the computer to detect a plurality of actual operating parameters and determine if there is a difference between the user defined parameters and the actual operating parameters. The instructions also cause the computer to adjust a wire feed speed according to the determination.

It is also contemplated that the invention described above be embodied as a method of controlling a wire feed control. The method including accepting user input and activating a power supply to operate according to the user input. The method further including determining the operating condition of a welding apparatus and a difference between the operating condition of the welding apparatus and the user input. The method further includes adjusting a wire feed speed automatically wherein the adjustment corresponds to the difference between the operating condition of the welding apparatus and the user input.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

What is claimed is:

1. A control operable with a wire feeder of a welding-type system, the control configured to:
   acquire a user selection wherein the user selection includes a mode selection and at least one of a current selection and a voltage selection;
   send a signal to a power supply of the welding-type system to cause the power supply to operate according to the user selection;
   acquire output conditions of the welding-type system;
   determine a difference between the user selection and at least one of the output conditions of the welding-type system to create an error margin; and
   adjust a wire feed speed automatically in response to the error margin to minimize the error margin.

2. The control of claim 1 wherein the mode selection is one of a constant current, a constant voltage, a constant current plus voltage, and a constant voltage plus current.

3. The control of claim 2 further configured to enable manually control of the wire feed speed and skip the acts of determining mud adjusting if the mode selection is constant current or constant voltage.

4. The control of claim 1 wherein the output conditions of the welding-type system include at least one of an arc condition, an actual current, and an actual voltage and wherein the mode selection is one of a constant current plus voltage or a constant voltage plus current.

5. The control of claim 4 wherein the error margin is determined by subtracting the actual voltage from the voltage selection if the selection mode selection is constant current plus voltage.

6. The control of claim 4 wherein the error margin is determined by subtracting the actual current from the current selection if the mode selection is constant voltage plus current.

7. The control of claim 4 further configured to determine and adjust only if the arc condition indicates an arc is present at the output of the welding-type system.

8. The control of claim 1 further configured to adjust the wire feed speed by an increment if the mode selection is constant current plus voltage and the error margin is less than zero or if the mode selection is constant voltage plus current and the error margin is greater than zero.

9. The control of claim 1 further configured to adjust the wire feed speed by a decrement if the mode selection is constant current plus voltage and the error margin is greater than zero or if the mode selection is constant voltage plus current and the error margin is less than zero.

10. The control of claim 1 wherein the wire feed speed remains constant if the error margin is equal to zero.

11. A welding-type system comprising:
a power supply;
a welding apparatus;
a wire feeder comprising:
a display and control panel configured to receive and display user selections;
a processor configured to execute a set of instructions that when executed causes the processor to;
receive a user selection from the display and control panel;
output operating constraints based on the user selection to the power supply;
determine present operating conditions of the welding apparatus; and
output a speed adjustment signal to control the speed of wire delivered by the wire feeder to reduce a difference formed between the operating constraints and the present operating conditions.

12. The welding-type system of claim 11 wherein the processor is further caused to determine whether an arc is present at the welding apparatus to determine the present operating conditions of the welding apparatus.

13. The welding-type system of claim 12 wherein the processor is further caused to output the speed adjustment signal only it the arc is present at the welding apparatus.

14. The welding-type system of claim 11 wherein the user selection is a mode selection and at least one of a target current and a target voltage.

15. The welding-type system or claim 14 wherein die mode selection is one of a constant current plus voltage and a constant voltage plus current.

16. The welding-type system of claim 15 wherein the processor is further caused to determine a difference between the target voltage and an actual voltage if the mode selection is constant current plus voltage or a difference between the target current and an actual current if the mode selection is constant voltage plus current.

17. The welding-type system of claim 16 wherein the speed adjustment signal causes the speed of wire delivered by the wire feeder to be increased if the made selection is constant current plus voltage and the difference between the target voltage and the actual voltage is less than zero or if the mode selection is constant voltage plus current and the difference between the target current and the actual current is greater than zero.

18. The welding-type system of claim 16 wherein the speed adjustment signal causes the speed of wire delivered by the wire feeder to be decreased if the mode selection is constant current plus voltage and the difference between the target voltage and the actual voltage is greater than zero or if the mode selection is constant voltage plus current and the difference between the target current and the actual current is less than zero.

19. The welding-type system ot claim 16 wherein the speed adjustment signal causes the speed of wire delivered by the wire feeder to remain constant if the mode selection is constant current plus voltage and the difference between the target voltage and the actual voltage is equal to zero or if the mode selection is constant voltage plus current and the difference between the target current and the actual current is equal to zero.

20. The welding-type system of claim 11 wherein the mode selection is one of a constant current or a constant voltage and wherein the processor is further configured to skip the step of outputting a speed adjustment signal and enable a manual wire feed control if the mode selection is one or constant current and constant voltage.

21. A computer readable storage medium having a computer program stored thereon and representing a set of instructions that when executed by a computer causes the computer to:
detect a plurality of user defined parameters;
activate a power supply to operate according to the user defined parameters;
detect a plurality of actual operating parameters;
determine if there is a difference between the user defined parameters and the actual operating parameters; and
cause a wire feed control to adjust a wire feed speed according to the determination.

22. The computer program of claim 21 wherein the plurality of user defined parameters includes a mode selection and at least one of a target current, and a target voltage.

23. The computer program of claim 22 wherein the mode selection is one of a constant current mode, a constant voltage mode, a constant current plus voltage mode, and a constant voltage plus current mode.

24. The computer program of claim 23 wherein the computer is caused to skip the acts of determining the difference between the user defined parameters and the actual operating parameters and adjusting a wire feed speed if the mode selection is the constant current mode or the constant voltage mode.

25. The computer program of claim 24 wherein the computer is further caused to enable a manually controlled wire feed control.

26. The computer program of claim 22 wherein the plurality of actual operating parameters includes an actual current, an actual voltage and an output arc presence.

27. The computer program of claim 26 wherein the act of determining if there is a difference between the user defined parameters and the actual operating parameters is calculated by subtracting the actual voltage from the target voltage if the mode selection is a constant current plus voltage or by subtracting the actual current from the target current if the mode selection is a constant voltage plus current.

28. The computer program of claim 27 wherein the wire feed speed is increased if the mode selection is constant current plus voltage and the difference between the user defined parameters and the actual operating parameters is less than zero or if the mode selection is constant voltage plus current and the difference between the user defined parameters and the actual operating parameters is greater than zero.

29. The computer program of claim 27 wherein the wire feed speed is decreased if the mode selection is constant current plus voltage and the difference between the user defined parameters and the actual operating parameters is greater than zero or if the mode selection is constant voltage plus current and the difference between the user defined parameters and the actual operating parameters is less than zero.

30. The computer program of claim 27 wherein the wire feed speed is constant if the difference between the user defined parameters and the actual operating parameters is equal to zero.

31. A method of controlling a wire feed control comprising:
accepting user input;
activating a power supply to operate according to the user input;

determining operating conditions of a welding apparatus;

determining a difference between at least one operating condition of the welding apparatus and the user input; and adjusting at wire feed speed automatically wherein the adjustment corresponds to the difference between the at least one operating condition of the welding apparatus and the user input.

32. The method of claim 31 wherein user input includes a mode selection and at least one of a target current and a target voltage.

33. The method of claim 32 wherein the mode selection is one of a constant current plus voltage mode and a constant voltage plus current mode.

34. The method of claim 33 wherein the operating condition of the welding apparatus is at least one of an actual voltage and an actual current.

35. The method of claim 34 wherein the act of determining the difference between the operating condition and the user input is calculated by subtracting an actual voltage from the target voltage if the method selection is a constant current plus voltage mode or by subtracting the actual current from the target current if the mode selection is a constant voltage plus current mode.

36. The method of claim 35 wherein the wire feed speed is increased if the mode selection is constant current plus voltage mode and the difference between the operating condition and the user input is less than zero or if the mode selection is constant voltage plus current mode and the difference between the operating condition and the user input is greater than zero.

37. The method of claim 36 wherein die wire feed speed is decreased if the mode selection is constant current plus voltage mode and the difference between the operating condition and the user input is greater than zero or if the mode selection is constant voltage plus current mode and the difference between the operating condition and the user input is less than zero.

38. The method of claim 37 wherein the wire feed speed is constant if the difference between the user defined parameters and the actual operating parameters is equal to zero.

* * * * *

UNITED STATES PATENT AND TRADEMARK OFFICE
CERTIFICATE OF CORRECTION

PATENT NO. : 6,858,818 B2
DATED : February 22, 2005
INVENTOR(S) : Craig S. Knoener It is certified that error appears in the above-identified patent and that said Letters Patent is hereby corrected as shown below:

Column 9,
Line 33, delete the word "die" and substitute therefor -- the --;

Column 10,
Line 4, delete the word "or" and substitute therefor -- of --;

Column 11,
Line 21, delete the word "method" and substitute therefor -- mode --.

Signed and Sealed this

Seventeenth Day of May, 2005

JON W. DUDAS
*Director of the United States Patent and Trademark Office*